United States Patent
Lautenschlager et al.

(10) Patent No.: US 6,570,977 B1
(45) Date of Patent: May 27, 2003

(54) CONNECTION SETUP METHOD, SERVICE CONTROL POINT, AND COMMUNICATIONS NETWORK

(75) Inventors: Wolfgang Lautenschlager, Weissach-Flacht (DE); Uwe Stahl, Leonberg (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/337,681

(22) Filed: Jun. 22, 1999

(30) Foreign Application Priority Data

Jun. 23, 1998 (DE) .......................... 198 27 956

(51) Int. Cl.⁷ .............................................. H04M 7/00
(52) U.S. Cl. ............................. 379/221.02; 379/221.13
(58) Field of Search ....................... 379/220.01, 221.01, 379/221.02, 221, 221.13

(56) References Cited

U.S. PATENT DOCUMENTS

| | | | |
|---|---|---|---|
| 5,696,816 A | * 12/1997 | Sonnenberg | 379/207 X |
| 5,748,717 A | * 5/1998 | Chan et al. | 379/115 X |
| 6,097,801 A | * 8/2000 | Williams et al. | 379/207 |
| 6,108,332 A | * 8/2000 | Kasiviswanathan | 379/220 X |
| 6,205,210 B1 | * 3/2001 | Rainey et al. | 379/113 X |

FOREIGN PATENT DOCUMENTS

| | | |
|---|---|---|
| DE | DT 1762491 | 8/1970 |
| DE | DT 1762170 | 3/1972 |
| DE | 43 29 172 A1 | 3/1995 |
| DE | 195 09 000 A1 | 9/1996 |
| DE | 195 15 856 A1 | 10/1996 |
| DE | 196 21 717 A1 | 12/1997 |
| EP | 0 453 831 A2 | 10/1991 |

* cited by examiner

Primary Examiner—Creighton Smith
(74) Attorney, Agent, or Firm—Sughrue Mion, PLLC

(57) ABSTRACT

A method for setting up a telecommunications connection from a calling subscriber (A) to a called subscriber (B) who is assigned to a numbering-plan area (AREA2) shared by two or several subscriber line networks (KN2, KN3, KN4) of different network operators (OP2, OP3, OP4) as well as a communications network (KN6) and a service control point (SCP) for implementing the method. A call request (CR) from subscriber line network (OP2) of the calling subscriber is routed to the communications network (KN6), which is assigned to a long distance carrier (OP6), and the connection between the calling subscriber (A) and the called subscriber (B) is set up via this communications network (KN6). The arrival of the call request (CR) at the communications network (KN6) of the long distance carrier (OP6) triggers an IN service. The IN service executes for the call request both an access monitoring function that monitors access to the communications network (KN6) of the long distance carrier (OP6) and a number portability function that determines the subscriber line network (KN3) of the called subscriber (B).

10 Claims, 2 Drawing Sheets

CONNECTION SETUP METHOD, SERVICE CONTROL POINT, AND COMMUNICATIONS NETWORK

This application is based on and claims the benefit of German Patent Application No. 198 27 956.6 filed Jun. 23, 1998, which is incorporated by reference herein.

BACKGROUND OF THE INVENTION

The invention relates to a method for setting up a telecommunications connection from a calling subscriber to a called subscriber according to the preamble of claim 1, a service control point according to the preamble of claim 9, and a communications network of a long distance carrier according to the preamble of claim 10.

In conventional connection setup methods, a call request is routed to the subscriber line of the called subscriber by means of the called subscriber's dial number entered in the call request. The dial number defines the path through the communications network and is evaluated step by step in the course of the path, i.e., it addresses first the local access and transit area and the local exchange and then the subscriber line of the called subscriber within the numbering-plan area of the local exchange.

The invention assumes a connection setup in a deregulated network environment in which a plurality of subscriber line networks of different network operators share a numbering-plan area, e.g., a local access and transit area, and number portability exists between the subscriber line networks of these network operators. Number portability means that there is free assignment of dial numbers of the numbering-plan area to subscriber line network operators and that consequently the subsciber line network of the called subscriber cannot be detected by a special identifier within the dial number. Such a connection setup method is described, for example, in the report entitled "High Level Service Description for Number Portability" by the Public Network Operators Interest Group dated Jun. 29, 1994.

Number portability is implemented by translating the dial number by means of call forwarding or by means of an IN service (IN=Intelligent Network). If a subscriber within a local access and transit area switches from a first network operator to a second network operator and wants to take his dial number with him, such call forwarding is installed in the subscriber line network of the first network operator. If a service of the subscriber line network of the first network operator detects a call request with this dial number, the call request is rerouted to the subscriber line network of the second network operator. This rerouting is implemented by entering in the call request, in place of the original dial number, a new dial number which addresses the called subscriber according to a second addressing scheme specially created for this case.

This connection setup method has the disadvantage that many services must be installed and their data inventory synchronized.

SUMMARY OF THE INVENTION

Thus, it is the object of the invention to implement a connection setup in a deregulated network environment with communications networks of different long distance carriers and subscriber line network operators with the least possible technical complexity.

This object is attained by a method for setting up a telecommunications connection from a calling subscriber to a called subscriber according to the teaching of claim 1, a service control point according to the teaching of claim 9, and a communications network of a long distance carrier according to the teaching of claim 10.

The invention is based on the idea of combining the access monitoring function for access to the communications network of a long distance carrier and the number portability function for determining the subscriber line network of the called subscriber within an IN service. This novel service is triggered when a call request arrives at the communications network of the long distance carrier.

This has the advantage of reducing the average number of services that need to be provided for connection setup within the deregulated network environment. The connection setup time is shortened and the required IN data processing capacity is reduced (IN=Intelligent Network). Furthermore, the number of databases and the number of total data to be stored and synchronized are significantly reduced.

A further advantage of the invention is that it can be integrated in the existing network architecture at little cost.

Advantageous embodiments of the invention are set forth in the subclaims.

It is particularly advantageous to provide a common database for executing the access monitoring function and the number portability function. The data required by both functions can be structured such that the number of stored data is significantly reduced compared to two separate databases.

BRIEF DESCRIPTION OF THE DRAWING

The invention will be explained below by way of example by means of several embodiments with the aid of the attached drawings.

DETAILED DESCRIPTION OF THE INVENTION

Figure 1:
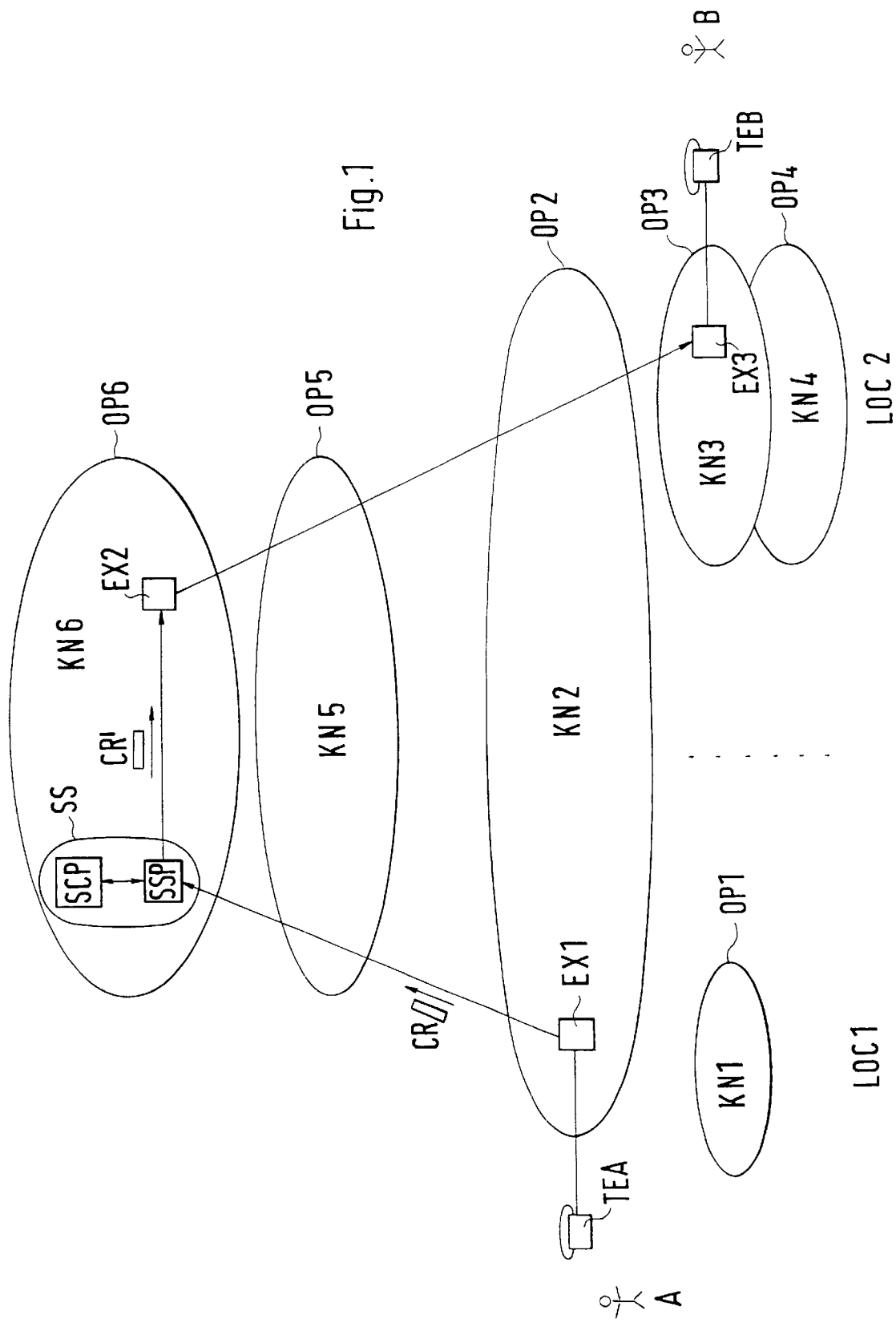
FIG. 1 shows a block diagram of a communications system with a plurality of communications networks of different network operators and with an inventive communications network.

FIG. 1 shows a communications system with a plurality of communications networks KN1 through KN6 assigned, respectively, to a network operator OP1, OP2, OP3, OP4, OP5, and OP6, and two terminals TEA and TEB assigned, respectively, to a subscriber A and B. From among the exchanges of the communications networks KN1 through KN6, four exchanges EX1 through EX3 and SSP are shown by way of example.

The communications networks KN1, KN3, and KN4 are subscriber line networks of local subscriber line network operators. Communications network KN1 covers a geographical area AREA1 and communications networks KN3 and KN4 cover a geographical area AREA2. Such subscriber line networks are conventional access networks for connecting telephone terminal equipment and private branch exchanges. Possible telephone terminal equipment includes telephones, fax equipment or modems and interface boards for connecting data processing systems. These can be ISDN terminals (ISDN=Integrated Services Digital Network) or analog terminals. The terminals can also be connected via an air interface, e.g., based on the DECT standard (DECT= Digital European Cordless Telecommunication) with such a subscriber line network. Terminals TEA and TEB are such terminals.

The subscriber line networks KN1, KN3, and KN4 are formed, respectively, by one or a plurality of interconnected subscriber line exchanges. For a greater traffic load, these subscriber line networks can furthermore comprise one or a plurality of transit exchanges.

The communications networks KN5 and KN6 are long distance networks of long distance network operators OP5 and OP6. Such long distance networks serve for connection setup between subscriber line networks and are thus formed by one or a plurality of interconnected transit exchanges.

The long distance carriers OP5 and OP6 can also have subscriber line networks in some or in several geographical areas and there play the role of subscriber line network operators. Thus, the telecommunications network operated by them would comprise both a long distance network and one or several subscriber line networks.

Communications network KN2 represents such a communications network comprising both subscriber line networks and a long distance network. In this exemplary embodiment it has subscriber line networks in the geographical areas AREA1 and AREA2. The communications network KN2 thus represents a communications network of a large network operator, e.g., the network of a former monopoly holder.

In the geographical area AREA1, a subscriber can thus choose between two subscriber line network operators OP1 and OP2. In the geographical area AREA2, a subscriber can choose between three subscriber line network operators OP2, OP3, and OP4. The communications networks of network operators OP1 and OP2 share the numbering-plan area of the geographical area AREA1 and the communications networks of network operators OP2 through OP4 share the numbering-plan area of the geographical area AREA2. A subscriber can furthermore choose between three long distance carriers OP2, OP5, and OP6. Subscriber A is a subscriber of network operator OP2, subscriber B is a subscriber of network operator OP3.

The setup of the communications networks KN5 and KN6 is now explained by way of example by means of the setup of communications network KN6. Communications network KN2 can be set up in the same manner as communications network KN6.

Communications network KN6 has a service control point SCP and one or a plurality of service exchanges, of which FIG. 1 shows exchange SSP. These service exchanges represent specially designed exchanges, which have a service switching unit, respectively, to execute a service switching function according to IN architecture. If such an exchange receives a special call request, it sends a service request message to the service control point SCP, which then executes a service logic assigned to the requested IN service to control the provision of the IN service. The service control point SCP and the one, or the plurality of service exchanges, in this case service exchange SSP, together form a service system SS, which provides this IN service. Physically, service control point SCP can be a separate server computer, but it can also be formed by a program integrated in the control of a service exchange.

Subscriber A initiates the setup of a telecommunications connection to subscriber B by sending a call request by means of his terminal TEA with the dial number of subscriber B as the destination dial number to the local exchange EX1, which is connected with his terminal TEA. This call request also indicates which long distance carrier is to be selected for the connection setup. This is realized in that a corresponding long distance carrier identifier is added to the call request, e.g. by dialing this carrier identifier before the dial number of subscriber B. By selecting the long distance carrier, subscriber A can set up his telecommunications connection at the lowest possible cost. The long distance carrier can also be selected automatically by the terminal TEA or by a service of exchange EX1. It is also possible for subscriber B to deternnine a long distance carrier in advance for all future connections.

Based on the long distance identifier, exchange EX1 of communications network KN2 routes a call request CR to communications network KN6 of long distance carrier OP6. This call request CR within communications network KN6 is routed to exchange SSP. Exchange SSP detects that the call request CR originates from an exchange of a different network operator and triggers the execution of an IN service by sending a service request message to the service control point SCP. The IN service is thus triggered when a call request originating from the communications network of a different network operator arrives at communications network KN6 of long distance carrier OP6. Thus, exchange SSP advantageously is a gateway exchange via which communications network KN6 is connected with communications network OP2 The information that a call request is being received at communications network KN6 is thus automatically available.

The IN service now executes two functions in one IN session for call request CR: an access monitoring function that monitors the access of call request [sic] to communications network KN6 of network operator OP6 and a number portability function that determines the subscriber line network of the called subscriber B. If subscriber A is authorized to set up a connection via the communications network KN6, the IN service forwards a call request CR', in which the subscriber line network KN3 of subscriber B is addressed, in the direction of subscriber B's terminal TEB.

The call request CR' is routed according to the information contained therein to exchange EX2, which represents a gateway exchange to the communications network KN2. From there, the call request CR' is routed to communications network KN3 and finally arrives at exchange EX3, which represents the subscriber line exchange of subscriber B. Subsequently, or parallel thereto, the telecommunications connection is set up according to the path traveled by the call request via communications networks KN2, KN6, and KN3.

The precise setup of the service control point SCP will now be explained by means of FIG. 2.

Figure 2:
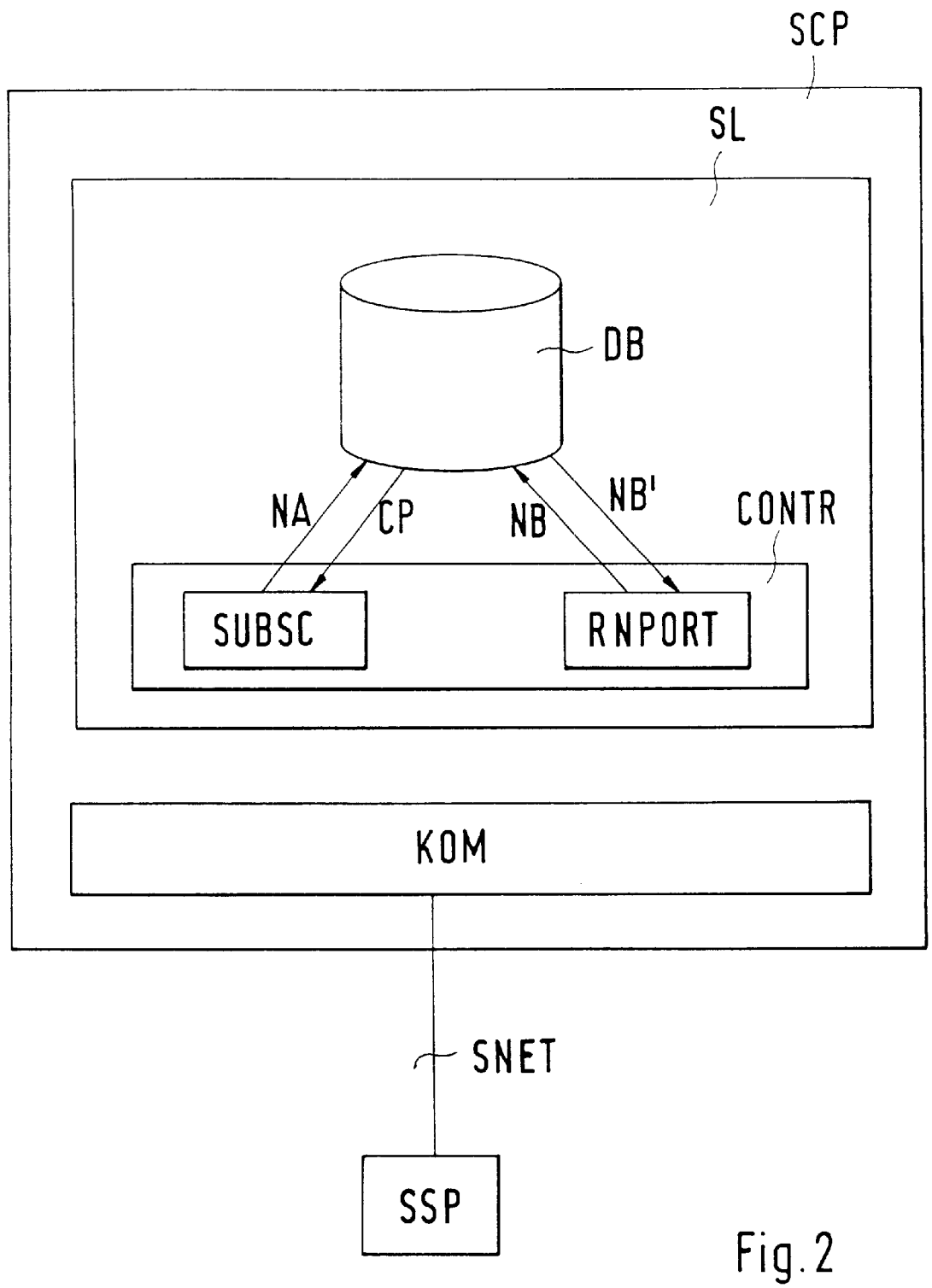
FIG. 2 shows a functional representation of a segment of the inventive communications network according to FIG. 1.

FIG. 2 shows the service control point SCP and the exchange SSP, which are interconnected via a signaling network SNET. The service control point is formed by one or a plurality of interconnected computers, which together with an operating system platform form a system platform on which the application programs run. From a functional point of view, the service control point SCP has a communications unit KOM and a service logic SL.

The service control point SCP can have additional service logics. Service logic SL would then be the service logic that is triggered by exchange SSP upon arrival of the call request at communications network KN6 of network operator OP6, as described above.

Communications unit KOM provides the hardware and software functions for communication with the service switching unit of exchange SSP and with the service switching units of the additional service exchanges of communications network KN6. It processes transport protocols No. 7 for communication via the signaling network SNET and the higher protocol layers according to the IN architecture (TCAP protocol, INAP protocol).

During its execution, the service logic SL controls the provision of the IN service. It has a control unit CONTR with the functions SUBSC and RNPORT, and a database DB, which these functions access.

Database DB need not form part of control unit SCP but can be connected with service control point SCP via a communications network through which control unit CONTR accesses it.

The control unit CONTR is activated by the service request message of the service switching unit and subsequently executes the functions SUBSC and RNPORT within an IN service session. Function SUBSC is an access monitoring function. It monitors whether call requests to communications network KN6 are sent from outside of communications network KN6 and determines how these call requests are to be handled. Thus, it monitors whether the subscriber originating the call request already has a contract with network operator OP6. If this is the case, connection setup is continued. If this is not the case, the calling subscriber is connected with an operator. For this purpose, one or several customer parameters are assigned to the subscribers in database DB. Customer parameters indicate, for example, whether the associated subscriber is already a customer of network operator OP6, for which telecommunication services a contract exists, or what tariffs the customer has selected. To determine the customer parameters, control unit CONTR sends dial number NA of calling subscriber A indicated in the call request to database DB and receives the customer parameters CP assigned to this dial number as the answer.

The access monitoring function SUBSC can also execute additional functions, e.g., it can co-protocol the connection setup or influence or control the metering of the connection setup. The access monitoring function SUBSC can also simply log the connection setup, e.g., for subsequent fee processing.

The function RNPORT is a number portability function. By accessing database DB, it determines from the dial number of the called subscriber the subscriber line network through which this subscriber is connected and controls the forwarding of the call request to this subscriber line network, e.g., by completing or replacing the called subscriber's dial number entered in the call request.

One possibility of determining the destination subscriber line network is that subscribers are assigned subscriber line networks in database DB. A subscriber line network can be addressed, for example, by a network identifier or by a network operator identifier. The control unit CONTR sends the called subscriber's dial number NB entered in the call request to database DB, which determines the network identifier or the operator identifier assigned to this dial number NB and returns it to control unit CONTR. Control unit CONTR adds this identifier to the called subscriber's dial number or enters it at a predetermined location within the call request.

A further possibility for determining the destination subscriber line network is that ported numbers are assigned to the dial numbers in database DB. Control unit CONTR sends the called subscriber's dial number NB entered in the call request to database DB, which in case of portage, returns a ported number NB'. Portage means that in the internal dial number scheme within a numbering-plan area, subnumbering areas are assigned to predefined subscriber line networks and, if a dial number does not correspond to this scheme, the external dial number is translated into an internal, ported number. Control. unit CONTR then replaces the called subscriber's dial number within the call request by this ported number NB'.

Function RNPORT can also support other methods of providing number portability, e.g., providing an internal dial number scheme.

Database DB comprises a data structure, which is accessed upon inquiries from both function SUBSC and function RNPORT. This data structure assigns customer parameters as well as operator identifiers, network identifiers, or ported numbers to dial numbers. It is of course also possible to use a different parameter other than the dial number to identify a subscriber, e.g., the subscriber's name or his customer ID.

The functions SUBSC and RNPORT can also access separate databases with different data structures, e.g., a first database, which assigns customer parameters to dial numbers, and a second database, which assigns ported numbers to dial numbers.

What is claimed is:

1. A method for setting up a telecommunications connection from a calling subscriber (A) to a called subscriber (B) who is assigned to a numbering-plan area (AREA2) shared by two or more subscriber line networks (KN2, KN3, KN4) of different network operators (OP2, OP3, OP4), the method comprising:

routing a call request (CR) from the subscriber line network (OP2) of the calling subscriber to a communications network (KN6) of a long distance carrier (OP6); and triggering an IN service performed by the communication network (KN6) of the long distance carrier (OP6) upon the arrival of the call request (CR) at the communications network (KN6) of the long distance carrier (OP6), wherein the IN service involves executing for the call request (CR) both an access monitoring function (SUBSC) that monitors the access to the communications network (KN6) of the long distance carrier (OP6) and a number portability function (RNPORT) that determines the subscriber line network (KN3) of the called subscriber (B).

2. A method according to claim 1, further comprising:
accessing the same database (DB) to execute the access monitoring function (SUBSC) and the number portability function (RNPORT).

3. A method according to claim 2, further comprising:
the database assigning to subscribers, respectively, at least one customer parameter describing a position of the subscriber as a customer of the long distance carrier and a subscriber line network identification.

4. A method according to claim 2, further comprising:
the database (DB) assigning to subscriber dial numbers (NA, NB), respectively, at least one customer parameter (CP) describing the position of the subscriber assigned the dial number as a customer of the long distance carrier and a ported number (NB').

5. A method according to claim 1, further comprising:
when the access monitoring function (SUBSC) is executed, checking by means of a dial number (NA) of the calling subscriber (A) entered in the call request whether the calling subscriber is a customer of the long distance carrier (OP6).

6. A method according to claim 1, further comprising:
when the number portability function is executed, adding an identifier for the subscriber line network of the called subscriber to a dial number of the called subscriber and entering the identifier in the call request.

7. A method according to claim 6, wherein the identifier for the subscriber line network designates the network operator of the subscriber line network.

8. A method according to claim 1, further comprising:
when the number portability function (RNPORT) is executed, translating a dial number (NB) of the called subscriber (B) into a subscriber's ported number (NB') and entering the ported number (NB') in the call request.

9. A service control point (SCP) comprising:
a communications unit (KOM) for communicating with at least one service switching unit of a communications network (KN6) of a long distance carrier (OP6); and
a service logic (SL) for executing an IN service,
wherein the service logic (SL), when triggered by the arrival of a call request (CR) at the communications network (KN6) of the long distance carrier (OP6), executes for the call request (CR) both an access monitoring function (SUBSC) monitoring the access to the communications network of the long distance carrier and a number portability function (RNPORT) determining a subscriber line network (KN3) of a called subscriber (B) designated in the call request (CR).

10. A communications network (KN6) of a long distance carrier (OP6) for setting up telecommunications connections between calling subscribers (A) and called subscribers (B) who are assigned to a numbering-plan area (AREA2) shared by two or more subscriber line networks (KN2, KN3, KN4) of different network operators (OP2, OP3, OP4), the communications network (KN6) comprising:

a service system (SS) operative such that the arrival of a call request (CR) to set up a connection between a calling subscriber (A) and a called subscriber (B) triggers an IN service in the communications network (KN6) of the long distance carrier (OP6), wherein the IN service executes for the call request (CR) both an access monitoring function (SUBSC) monitoring the access to the communications network (KN6) of the long distance carrier (OP6) and a number portability function (RNPORT) determining the subscriber line network (KN3) of the called subscriber (B).

* * * * *